Patented Aug. 14, 1951

2,564,423

UNITED STATES PATENT OFFICE 2,564,423

CORROSION PREVENTIVE COMPOSITION

Emmett R. Barnum, Berkeley, Calif., assignor to Shell Development Company, San Francisco, Calif., a corporation of Delaware No Drawing. Application May 29, 1948,
Serial No. 30,190

13 Claims. (Cl. 106—14)

This invention relates to an all purpose corrosion inhibiting composition. More particularly this invention pertains to corrosion inhibiting compositions having the ability of displacing moisture, corrosive materials and the like from metal surfaces and forming thereon a tenacious protective film, which is impervious to moisture and other corrosive contaminants.

It is well known that moisture, corrosive fluids and gases, e. g. $H_2S$, $SO_2$, etc. readily attack not only metallic surfaces but non-metallic surfaces and cause corrosion, rusting, pitting and other damage to such surfaces. Also aqueous solutions when in contact with a metallic surface readily attack it and cause corrosion and rusting. Under certain conditions the problem of corrosion becomes exceedingly serious because once started it becomes progressively accelerated. Thus, oils containing small amounts of water become very corrosive to contacting metals. This is due to the fact that oils and particularly liquid petroleum hydrocarbons are relatively good solubilizers of oxygen and any moisture present therein becomes surrounded by an almost inexhaustible store of oxygen. Moisture under such conditions is inhibited from evaporating and since the rate of transfer of oxygen from hydrocarbons, such as mineral oil or gasoline, to water is limited, ideal conditions for rusting and corrosion are set up. The presence of electrolytes and formation of corrosive decomposition products in oils and the like also greatly increase the rate of corrosivity.

Under conditions where, in addition to those enumerated, elevated temperature is encountered, corrosion activity is greatly accelerated. Thus moisture, salt sprays and other contaminants or acidic composition products and corrosive gases formed during operation of engines, such as internal combustion engines, Diesel engines, aircraft engines, turbines and various other machinery and industrial equipment, readily attack and rust or corrode contacting metal surfaces. The damage thus caused is not to the metal surface alone for rust particles frequently break off and enter the circulating system of engines and cause plugging, clogging, and fouling of conduit lines, columns, plates, and the line of cracking equipment, tubes, evaporators, etc.

Corrosion of alloyed bearings and other alloyed surfaces due to contact with water can attain such an aggravated stage as to cause great fatigue stresses to be set up, which ultimately result in cracking of the metal.

The problem is equally serious when combating rusting and corrosion of steel drums, storage tanks used to store gasoline, hydrocarbon oils and the like. Moisture adhering to pickled steel, quenched steel, equipment such as instruments, engine starters and generators on landing crafts, hydraulic systems, machinery for metal processing and the like are also extremely susceptible to corrosion and must be protected.

Besides metal surfaces, materials such as rubber equipment, electrical insulation materials, brake and clutch lining, etc. suffer damage when in contact with water, aqueous solutions, corrosive fluids and the like.

Such contaminants also have a detrimental effect upon the medium in which they are dispersed. In lubricating and liquid fuel mediums they cause oxidation, interfere with the functioning of additives or decrease their efficiency, form emulsions and thickening of the fluid and generally cause gumming and sticking of movable parts.

Countless materials and compositions have been tried for protecting surfaces by forming on said surface a non-reactive corrosion protective film having lubricating properties. Metal surfaces have been coated or treated with greases, fatty compositions, waxes, organic compounds, e. g. organic acids, amines; inorganic compounds and the like in order to protect them against corrosion. In almost all cases where no chemical reaction occurred between the surface treated and the corrosion or rust inhibitor very little benefit was derived. This is due to the fact that non-chemical reactive inhibitors are incapable of penetrating the surface being protected and are incapable of displacing the contaminant therefrom. In cases where such inhibitors are able to form protective coatings on surfaces they are easily displaced by moisture or rupture readily. They are relatively ineffective against corrosive acidic materials and hot gases such as are formed during operation of combustion and turbine engines and are easily destroyed when applied to surfaces which are subjected to high temperatures.

It is an object of this invention to protect metal surfaces in contact with corrosive contaminants against corrosion by treating said surfaces with a composition having the property of displacing said contaminants from said surface and forming thereon an impermeable tenacious protective film. It is another object of this invention to protect metallic surfaces with a water displacing, water resistant non-corrosive protective film having no detrimental effect upon the metal surface treated.

It is still another object of this invention to provide metal surfaces with a water and acid resistant film which is not susceptible to rupture even at elevated temperatures and which could be readily removed when desired. Still another object of this invention is to form protective film on metal surfaces which are not detrimental to contacting fluids and which do not interfere with their function as lubricants, hydraulic fluids, quenching agents and the like. Another object of this invention is to form a composition of matter capable of protecting metal surfaces from corrosion, said composition also possessing lubricating properties. Another object is to produce film forming metal protective compositions which are stable and readily miscible with petroleum hydrocarbons such as lubricating oils or other inert organic carriers and the like. It is also another object of this invention to treat surfaces whether metallic or non-metallic so as to form thereon a protective film which is impervious to moisture and corrosive fluids, and which can be readily removed when desired. Other objects will be apparent from the following description.

It has been found that certain partially esterified polyhydric alcohols wherein the ratio of free hydroxy to ester radicals is at least 1:1 and preferably greater than 1:1 exhibit anti-corrosive properties when applied to metallic surfaces in solution of hydrocarbon oils. However, this discovery by itself is of little practical value since frequently these compounds have very limited solubilities in hydrocarbons, particularly at relatively low temperatures at which rust proofing oils may have to be used. Thus, the solubility of glyceryl mono oleate in a refined mineral oil at 75° F. is about 0.25%, at 70° F. about 0.1% and at 50° F. immeasurably small. To enable the dissolution of effective amounts, mutual solvents are required.

A considerable number and variety of substances have been evaluated as mutual solvents in attempts to overcome this difficulty but have been found unsatisfactory for one or more reasons. Thus, the addition of amines does not produce satisfactory solution stability and frequently decreases the oxidation stability of the organic medium, oil-soluble alcohols decrease the corrosion protection in addition to yielding unstable solutions, oleic acid and other normally liquid fatty acids increase the solubility of the dihydroxy alcohols in mineral oil but greatly reduce their rust inhibiting potency, etc.

It has been discovered, however, that this problem may be solved in a highly satisfactory manner by the employment of salts such as salts derived from heterocyclic five member ring compounds containing carbon, nitrogen and oxygen, and organic acids such as fatty acids, naphthenic acids, sulfonic acids and the like.

The nitrogen portion of the solubilizer and corrosion inhibiting accelerator for ester alcohols may consist of salts of oxazoline, isoxazoline, oxazolidine, isoxazole and the like. These materials may contain various substituent groups so as to aid in oil solubilization of the ester alcohol and enhance its corrosion inhibiting properties. The acid portion used to form the salts is not a critical factor and may include any acid, preferably having at least 8 carbon atoms. Among these may be included capric, lauric, myristic, palmitic, stearic, linoleic, oleic, hydroxy stearic, ricinoleic acids; alkyl malonic, alkyl succinic, alkyl maleic, alkyl malic, alkyl tartaric, alkyl citric acids; esters of alcohols derived from natural fats and inorganic acids e. g. phosphate esters of phosphoric acids and alcohols derived from cocoanut oils. The alkyl group in the above acids is of sufficient length so as to solubilize the additive in the oil. Other acids are phosphoric, phenyl acetic, phenyl stearic, naphthenic, sulfonic acids and the like. The sulfonic acids are particularly preferred as the acid portion of the salts of this invention and may be obtained as a by-product, known in the art as mahogany acids, from the treatment of petroleum (for example, lubricating oil fractions) with sulfuric acid. However, oil-soluble sulfonic acids may also be obtained from the treatment of many other organic compositions such as alkyl benzenes, alkyl naphthalenes, coal tar, etc. with concentrated sulfuric acid, or by treatment of aliphatic or cycloaliphatic compounds such as $C_{10}$ and higher hydrocarbons with chlor sulfonic acid. Oil-soluble sulfonates of dicarboxylic acid esters such as malonic acid esters represent still another type.

While many of these salts have some corrosion inhibiting properties themselves, this property becomes accentuated when in combination with ester alcohols and also these salts enhance the corrosion inhibiting properties of the polyhydric alcohol esters in addition to solubilizing them. The polyhydric alcohol esters should be present in predominant amounts and the salts should be present only in such amounts as is actually necessary to hold the ester alcohols in solution at the lowest temperature to which the composition will be exposed during storage, transportation or use. Excessive amounts of the salts of this invention can produce harmful effects due to the mechanism of the corrosion inhibition by ester alcohols with which the salts might interfere if present in large quantities. This mechanism apparently involves plating out of the alcohol from its solution on the metal surface. The closer the solution is to its saturation point with respect to the ester alcohol, the more easily is the latter plated out. For this reason, the ester alcohol must be only little soluble in the hydrocarbon medium, and in general best results are obtained with ester alcohols whose solubility at normal room temperature in hydrocarbon oils is below that of effective inhibiting concentration, so that at least a small amount of a solubilizer is required to produce storage-stable solutions. On the other hand, solubility must not be too low, as otherwise excessive amounts of the salts are required which would interfere with the flow and other properties of the composition. Ester alcohols of relatively high melting points, i. e. about 200° F. or higher, are in general too insoluble to be usable, and for best performance a melting point below about 200° F. is desirable.

The corrosion inhibiting ester alcohols should contain not less than two free OH radicals separated by not more than three intervening atoms. Preferably at least one hydroxyl radical is on a terminal carbon atom but it may be removed from such terminal carbon atom by as many as three or four atoms. Additional OH radicals may be located near the first two hydroxyl groups. To this alcoholic portion of the molecule there is attached a predominantly hydrocarbon portion containing a number of carbon atoms sufficient to give the molecule a total minimum carbon content of about 12 and preferably about 15 to 46 carbon atoms. This hydrocarbon portion is attached to the alcoholic portion of the molecule through an ester linkage which may be formed between the hydroxyl or an acid radical (if there is one) of the polyhydric alcohol on the one hand, and an acid or alcohol respectively on the other. It is desirable that the hydroxyl radicals and ester linkages of the ester alcohol be as close together as possible, at least two hydroxyl radicals being separated from each other by not more than three directly connected atoms and preferably being attached to vicinal carbon atoms. It is advantageous if the several polar groups are attached to directly connected carbon atoms.

It will be seen that the ester alcohols may be derivatives of glycerine, erythritol, penta erythritol, mannitol, sorbitol, sorbitan, citric acid, etc. The acid (or alcohol, as the case may be) forming the ester with the polyhydric alcohol should have at least about 10, and preferably between about 10 and 40, carbon atoms, in the form of an aliphatic or cycloaliphatic radical.

Suitable radicals comprise, for example, capryl, decyl, cetro-nellyl, undecyl, undecylenyl, lauryl (dodecyl), tridecyl, myristyl (tetradecyl) myristolenyl, pentadecyl, palmityl (hexadecyl), hypogaeyl, palmitolenyl, therapinyl, oleyl, elaidyl, erucyl, stearyl, abietyl, etc. Radicals such as are contained in the acids obtained from rosin or tall oil as well as in naphthenic (i. e. cycloaliphatic) acids having the requisite number of carbon atoms are also applicable.

The acid which may form the ester with the polyhydric alcohol is preferably a carboxylic acid, although sulfonic, phosphoric, alkyl phosphoric, etc., acids are also useful.

Some specific partial esters which are particularly preferred are: glycerol monocaprylate, glycerol monopalmitate, glycerol monooleate, glycerol monosterate, glycerol monoricinoleate, sorbitol monooleate, sorbitol dioleate, mannitol palmitate, mannitol stearate, mannitol monocitrate, pentaerythritol mono and dioleate, pentaerythritol mono and dicaprylate, sorbitan monooleate, mannitan monopalmitate, mannitan dioleate, sorbitan monostearate, etc.

Adequate corrosion inhibiting quantities of the present ester alcohol are on the order of from about 0.5% or preferably 1% w. up to about 5% or 10% w. depending on the nature of the particular application. Usually a concentration of about 2%–3% w. is satisfactory. The amount of the salts used, depending on its solubility in the particular petroleum medium involved, the solubility of the ester alcohol in the petroleum medium, and the solubility of the ester alcohol in the salts, may vary from about 3 times to ½₀ and preferably about 1½ times to 1/15 that of the ester alcohol. Usually the solubility of these alcohols is greater in relatively aromatic as well as more viscous petroleum fractions than in relatively paraffinic and/or lighter oils.

The hydrocarbon medium employed to disperse the ester alcohols is preferably a liquid, although it may be a solid or plastic such as paraffin, petrolatum or soap-thickened grease. It is desirable that asphaltenes or resinous constituents of crude petroleum be absent, since they may interfere with the rust protection of the ester alcohols; hence the media comprise generally refined mineral oil or fractions thereof. Refining may be by percolation, sulfuric acid treatment, extraction with selective solvents, propane precipitations, etc. The particular fraction of refined mineral oil which is employed will of course vary with the specific application. If it is desired to produce a rust-inhibiting lubricant for an internal combustion engine the present additives will be incorporated in a lubricating oil which otherwise meets the requirements, such as viscosity, viscosity index, pour point, volatility, color, etc. for this use. On the other hand, if a general utility or instrument oil is required, the additives will be added to an oil of lower viscosity as the case may require, for example having a viscosity at 100° F. of 10–25 cs. The compositions of this invention may be applied to metal surfaces by rolling, dipping, brushing, spraying, swabbing, trowelling, etc.

The method of preparing some particular types of salts of this invention is given as hereinbelow for purposes of illustration and any other type of salt of this general class may be used to solubilize the desired esters.

Particularly desirable salts used to solubilize the ester alcohols are derived from oxazoline compounds. The oxazolines may be derived from amino hydroxy compounds through their fatty amides, or the oxazolines may be made by reacting an amino hydroxy compound with a nitrile. Any other procedure may be followed to prepare these heterocyclic compounds.

In preparing the oxazolines through their fatty acid amides, a suitable amino hydroxy compound is reacted with a desirable aliphatic carboxylic acid at an elevated temperature to yield an amide. The temperature is then increased so as to split out water and form the oxazoline. The temperature for the initial amide formation and final oxazoline formation depends upon the reacting materials employed and generally is within the range of 150° to 170° C. for the initial reaction and around about 250° C. for the final rejection.

Examples of suitable hydroxy amino compounds are the primary aliphatic amine having the hydroxy group on the carbon atom adjacent to the carbon atom bearing the amino radical and specifically the following compounds may be mentioned although they are not to be construed as a limitation: mono-ethanol amine, ethanol amine, 2-methyl-2-amino-1,-propanol, 2-methyl-2-amino-1, 2-ethyl-2-amino-1, 3 tris(hydroxy methyl) amino methane, 2 - amino-1,-butanol, 2-amino-1-pentanol, 2-amino - 1 - ethanol, 2´- amino-3-butanol, 3-amino-4-pentanol, 3-amino-4-hexanol, 2-amino-3-heptanol and the like.

The acids which may be used to prepare oxazolines from the above amino compounds are saturated and unsaturated aliphatic acids such as acetic, propionic, butyric, caproic, heptoic, caprylic, pelargonic, capric, undecylic, lauric, tridecylic, myristic, pentadecylic, palmitic, stearic, nondecylic, archidic acids: acrylic, butenic, critonic, pentenic, tiglic, hexenic, teracrylic, hypoglic,, oleic, erucic acids and the like, as well as fatty acids derived from animal, vegetable and fish oils.

If the oxazolines are prepared from amino hydroxy compounds as referred to above and nitriles, the nitriles which can be used are alkyl, aryl, alkoxyalkane oralkoxy alkoxylalkane nitrile e. g. (ethoxy methoxy) ethane nitrile, (ethoxy ethoxy) octane nitrile, (methoxy methoxy) ethane nitrile, and nitriles of hexane, octane, decane, dodecane, tetradecane, hexadecane, octadecane, and the like. Also if oxazolidienes are used they may be prepared by reaction of a suitable amino hydroxy compound and an aldehyde. Thus oxazolidines may be prepared by reacting one mol of an amino monohydric alcohol with one mol of an aldehyde such as formaldehyde, acetaldehyde, butyraldehyde, isobutyraldehyde, benzaldehyde, ethyl hexaldehyde, propionaldehyde and the like.

To form the salt compounds of this invention the above type of nitrogen containing compounds are reacted with a suitable acid such as fatty acids and hydroxy fatty acids of at least 10 carbon atoms, polycarboxylic acids, aromatic substituted aliphatic acids, naphthenic acids, sulfonic acids, phosphoric acids and the like. Such acids are: capric, lauric, myristic, palmitic, stearic, linoleic, oleic, hydroxy stearic, ricinoleic, phenylacetic, phenyl stearic, alkyl succinic, alkyl maleic, alkyl malic, alkyl tartaric, alkyl citric, petroleum sulfonic acids, the carboxylic acids obtained by oxidation of petroleum, tall oil acids, and the like.

Some specific salts of organic acids are listed below in such a manner as to indicate that any of the nitrogen containing portion of the compound may be combined with any of the acid portion to form the salts of this invention.

*Nitrogen containing portion*

2-heptyl-4-hydroxylmethyl-4-ethyloxazoline
Tridecyl-4-hydroxylmethyl-4-ethyloxazoline
2-octyl-4-hydroxylmethyl-4-ethyloxazoline
2-hendecyl-4-hydroxylmethyl-4-ethyloxazoline
2-octyloxazoline
2-hendecyloxazoline
2-hendecyl-4,4-dimethyloxazoline
2-heptadecyl-4,4-dimethyloxazoline
2-pentyl-4,5-dimethyl-4-hexanooxyethyl - 2-oxazoline
2-undecyl-4-methyl-4-lauroxymethyl - 2 - oxazoline
2-undecyl-4,4-dimethyl-5-phenyl-2-oxazoline
Dioctyloxazole
Ethyloctyloxazole
Diethyloctyloxazole
Diheptyloxazole
Butyl-oxazolidine
Diethyl-oxazolidine
Diheptyl-oxazolidine
Ethyloctyloxazolidine
Propyloctyloxazolidine
Ethyloctylisoxazole
Dioctylisoxazole
Dibutylisoxazole
Propylbutylisoxazole and the like

*Acidic parts*

Capric acid
Lauric acid
Myristic acid
Palmitic acid
Stearic acid
Hydroxy stearic acid
Ricinoleic acid
Oleic acid
Lactic acid
Alkyl malonic acid
Alkyl succinic acid
Citric acid
Petroleum sulfonic acid
Amyl sulfonic acid
Tri-isopropyl naphthalene sulfonic acid
Dilorol phosphoric acid
and the like.

The preferred compounds which are used to solubilize ester alcohols are the oxazoline salts of ricinoleic, oleic, stearic, petroleum sulfonic and dilorol phosphoric acids and their mixtures and the like.

Any of the above oxazoline salts may be prepared by simply admixing an oxalzoline and the like with a desirable acid in a vessel either at room temperature or slightly elevated temperature with constant stirring until the reaction is completed.

To illustrate the pronounced corrosion inhibiting properties of compositions of this invention the following tests were conducted and the results tabulated.

Aluminum strips 1 x 2 inches were dipped into the designated oil for 1 minute, drained for 24 hours at room temperature, immersed in an aqueous solution of 5.7% sodium chloride and 0.3% hydrogen peroxide for 24 hours, revived, cleaned and examined for corrosion.

| | Oil | Additive | Per Cent Corroded after 24 hours |
|---|---|---|---|
| 1 | Light Spray Oil of about 60 SUS at 100° F. | | 100 |
| 2 | ----do---- | 3% Oxazoline salt of petroleum sulfonic acid. | 20 |
| 3 | ----do---- | 3% Oxazoline salt of petroleum sulfonic acid plus 3% glycerol monooleate. | 0 |
| 4 | ----do---- | Glycerol monooleate. | 30 |

Sand-blasted specimens (2" x 3" x ⅛") were dipped into a designated oil for 1 minute at room temperature, drained 2 to 20 hours at room temperature then placed in the humidity cabinet as prescribed in specification AN-O-6A except then the temperature of the cabinet was 100° F. instead of 120° F.

Other sand-blasted steel specimens were dipped into the designated oil at room temperature for 5 seconds, drained 2 hours at room temperature then immersed in synthetic sea water[1] for 24 hours. The specimens were then examined for rust.

[1] Composition of synthetic sea water:
Sodium chloride, 25 gm. per liter of aqueous solution
Magnesium chloride (6H₂O), 11 gm. per liter of aqueous solution
Sodium sulfate, 4 gm. per liter of aqueous solution
Calcium chloride, 1.2 gm. per liter of aqueous solution

| | Oil | Additive | Humidity Cabinet | Sea Water Immersion |
|---|---|---|---|---|
| | | | Hours | |
| 1 | Mineral oil (550-585 SUS at 100° F.). | | 24 | Heavy Rust. |
| 2 | ----do---- | Sorbitan monooleate. | 24 | Medium Rust. |
| 3 | ----do---- | 1% oxazoline salt of petroleum sulfonic acid. | 11 | Substantially no Rust. |
| 4 | ----do---- | 1% oxazoline salt of petroleum sulfonic acid plus 3% glycerol monooleate. | 53 | Do. |
| 5 | ----do---- | 1% sorbitan monooleate plus 1% oxazoline salt of petroleum sulfonic acid. | 52 | Do. |
| 6 | ----do---- | 4% sorbitan monooleate plus 3% oxazoline salt of petroleum sulfonic acid. | 82 | Do. |

Other additives can be included in composition of this invention such as long chain aliphatic amines e. g. hexyl, octyl, decyl, dodecyl, octadecyl amines, microcrystalline petroleum wax, inorganic salts e. g. sodium and lithium nitrite, the chromates; nitroalkanes, e. g. nitrodecane, nitropropane, etc. and the like.

Instead of using mineral oil as the base other carriers may be used such as various petroleum naphtha cuts, mineral spirits, mineral seal oil, kerosene, gas oils, mineral oil, waxes, kerosene $SO_2$ extract, aromatic solvents, petroleum ether, aromatic hydrocarbons such as benzene, p-xylene, o-xylene, m-xylene, cumene, butyl benzene; paraffinic hydrocarbons e. g. normal hexane, dimethyl pentane, octane, nonane, undecane, dodecane, cycloparaffin, e. g. cyclohexane, methylcyclohexane, isopropylcyclohexane, halogenated hydrocarbons such as chlorinated kerosene, carbon tetrachloride, chloroform, synthetic oils, e. g. olefin polymers, polymerized alkylene oxides, alkyl ester e. g. 2-ethylhexyl sebacate, ethyl ricinoleate, dioctyl phthalate, tricotyl phosphate, fluorohydrocarbons, etc. The dispersing medium constitutes around about 75% to above 95% of the composition, depending upon its viscosity, penetrability and particular application or condition under which it is used.

This application is a continuation-in-part of the co-pending application, Serial No. 744,536, filed April 28, 1947.

I claim as my invention:

1. A corrosion inhibiting composition comprising a major amount of a liquid hydrocarbon having dispersed therein a minor amount of a partial ester selected from the group consisting of glycerol monooleate, sorbitan monooleate and pentaerythritol dioleate, said partial ester being solubilized in said liquid hydrocarbon in an amount of at least 0.5% and up to 10%, by weight, by a minor amount of a salt of a base selected from the group consisting of oxazoline, isoxazoline, oxazolidine and isoxazole and of an organo acidic compound selected from the group consisting of petroleum sulfonic acid and unsaturated aliphatic monocarboxylic acid of 18 carbon atoms.

2. A corrosion inhibiting composition comprising a major amount of a liquid hydrocarbon having dispersed therein a minor amount of at least 0.5% and up to 10%, by wt., of a partial ester selected from the group consisting of glycerol monooleate, sorbitan monooleate and pentaerythritol dioleate, and a minor amount, sufficient to solubilize said partial ester, of oxazoline salt of ricinoleic acid.

3. A corrosion inhibiting composition comprising a major amount of a liquid hydrocarbon having dispersed therein a minor amount of at least 0.5% and up to 10% by weight of glycerol monooleate and a minor amount, sufficient to solubilize said glycerol monooleate of oxazoline salt of petroleum sulfonic acid.

4. A corrosion inhibiting composition comprising a major amount of a liquid hydrocarbon having dispersed therein a minor amount of at least 0.5% and up to 10% by weight of glycerol monooleate and a minor amount, sufficient to solubilize said glycerol monooleate of oxazoline salt of ricinoleic acid.

5. A corrosion inhibiting composition comprising a major amount of a liquid hydrocarbon having dispersed therein a minor amount of at least 0.5% and up to 10% by weight of sorbitan monooleate and a minor amount, sufficient to solubilize said sorbitan monooleate, of oxazoline salt of petroleum sulfonic acid.

6. A corrosion inhibiting composition comprising a major amount of a liquid hydrocarbon having dispersed therein a minor amount of at least 0.5% and up to 10% by weight of sorbitan monooleate and a minor amount, sufficient to solubilize said sorbitan monooleate of oxazoline salt of ricinoleic acid.

7. A corrosion inhibiting composition comprising a major amount of a liquid hydrocarbon having dispersed therein a minor amount of at least 0.5% and up to 10% by weight of pentaerythritol dioleate and a minor amount, sufficient to solubilize said pentaerythritol dioleate of oxazoline salt of petroleum sulfonic acid.

8. A corrosion inhibiting composition comprising a major amount of mineral oil having dispersed therein a minor amount of at least 0.5% and up to 10% by weight of glycerol monooleate and a minor amount sufficient to solubilize said glycerol monooleate of oxazoline salt of petroleum sulfonic acid.

9. A corrosion inhibiting composition comprising a major amount of mineral oil having dispersed therein a minor amount of at least 0.5% and up to 10% by weight of sorbitan monooleate and a minor amount sufficient to solubilize said sorbitan monooleate of oxazoline salt of petroleum sulfonic acid.

10. A corrosion inhibiting composition comprising a major amount of mineral oil having dispersed therein a minor amount of at least 0.5% and up to 10% by weight of pentaerythritol dioleate and a minor amount sufficient to solubilize said pentaerythritol dioleate of oxazoline salt of petroleum sulfonic acid.

11. A corrosion inhibiting composition comprising a major amount of mineral oil having dispersed therein a minor amount of at least 0.5% and up to 10% by weight of glycerol monooleate and a minor amount sufficient to solubilize said glycerol monooleate of oxazoline salt of ricinoleic acid.

12. A corrosion inhibiting composition comprising a major amount of mineral oil having dispersed therein a minor amount of at least 0.5% and up to 10% by weight of sorbitan monooleate and a minor amount sufficient to solubilize said sorbitan monooleate of an oxazoline salt ricinoleic acid.

13. A corrosion inhibiting composition comprising a major amount of mineral oil having dispersed therein a minor amount of at least 0.5% and up to 10% by weight of pentaerythritol dioleate and a minor amount sufficient to solubilize said pentaerythritol dioleate of oxazoline salt of ricinoleic acid.

EMMETT R. BARNUM.

REFERENCES CITED

The following references are of record in the file of this patent:

UNITED STATES PATENTS

| Number | Name | Date |
| --- | --- | --- |
| 2,382,699 | Duncan | Aug. 14, 1945 |
| 2,398,193 | Sharp | Apr. 9, 1946 |
| 2,412,634 | Schwartz | Dec. 17, 1946 |
| 2,434,490 | Duncan | Jan. 13, 1948 |
| 2,442,581 | Bishop | June 1, 1948 |
| 2,442,582 | Bishop | June 1, 1948 |